June 6, 1933.　　V. MULHOLLAND　　1,913,311
METHOD OF AND APPARATUS FOR SUPPLYING GLASS
Filed Aug. 28, 1929
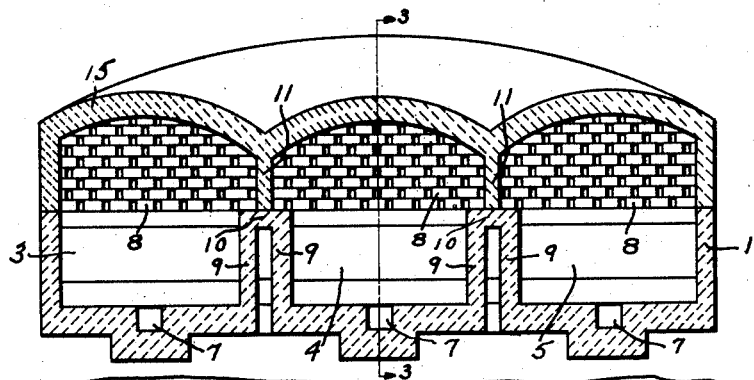
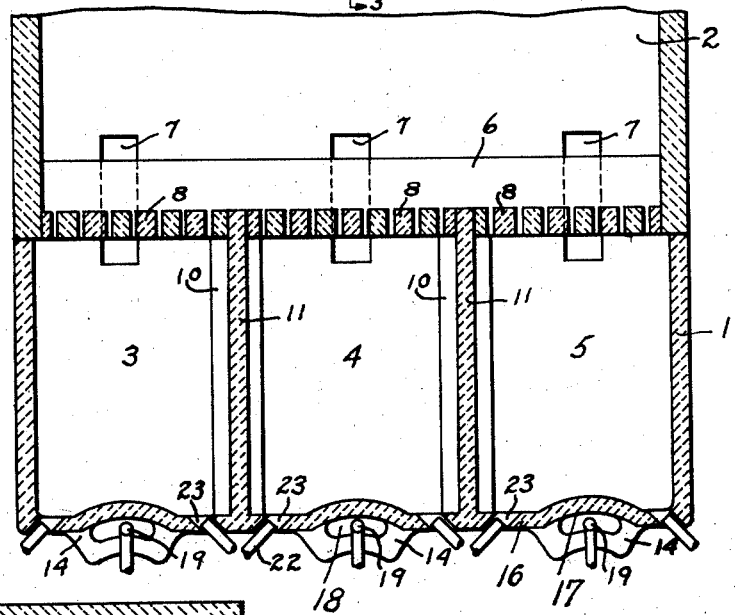
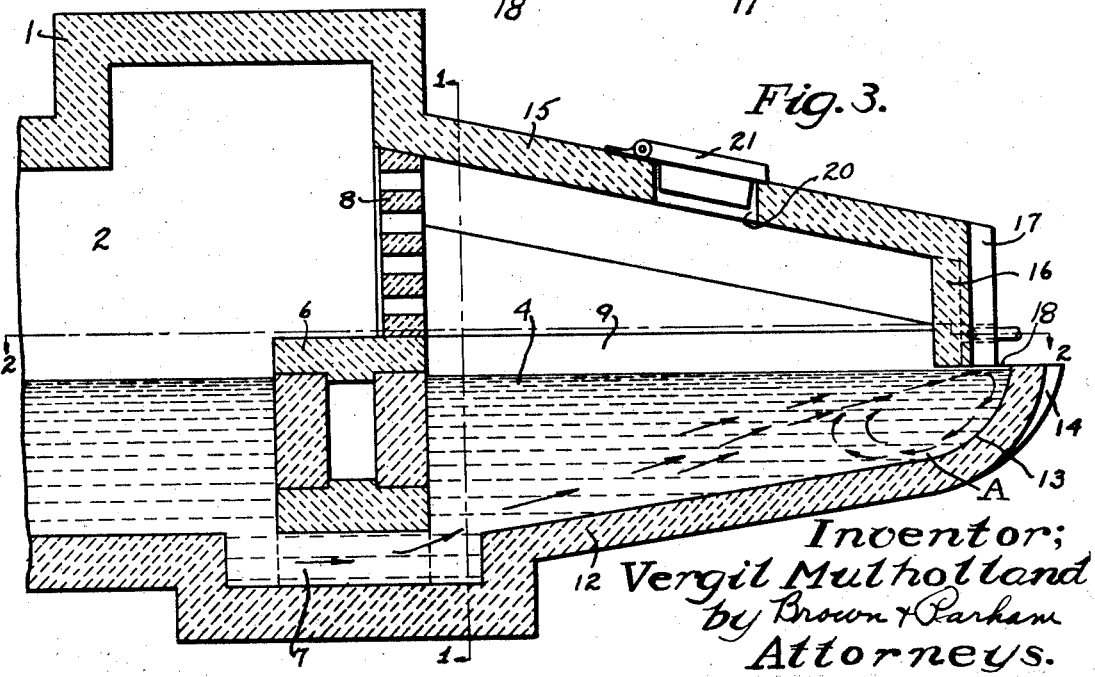
Inventor;
Vergil Mulholland
by Brown & Parham
Attorneys.

Patented June 6, 1933

1,913,311

UNITED STATES PATENT OFFICE

VERGIL MULHOLLAND, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR SUPPLYING GLASS

Application filed August 28, 1929. Serial No. 388,873.

My invention relates to methods of and apparatus for supplying molten glass, and has particular relation to methods of and apparatus for maintaining a supply of molten glass of homogeneous character and having the desired viscosity.

In preparing and supplying molten glass to forming machines, one practice has been to conduct the molten glass from the melting end of a melting tank or furnace into a refining chamber, and thence into a suitable forehearth or gathering pool from which the glass is supplied to the molds of the forming machine. While such a procedure produces satisfactory glassware in some cases, the use of the type of apparatus referred to usually is uneconomical because of its size and the cost of maintenance thereof, and situations not infrequently arise where a supply body possessing the desired qualities cannot be obtained.

Various factors affecting the character of molten glass and articles produced therefrom should be considered. Most of these factors are concerned either directly or indirectly with the temperature conditions to which the glass is subjected and which may exist in the glass itself, and with the manner in which the glass is circulated. As molten glass flows from a melting chamber into a refining chamber it tends to stratify, and pockets of stagnated glass are apt to form therein, such portions of the glass being cooler than other portions thereof, they undergo changes in character, as for example, devitrification. As is well known, devitrified glass causes undesirable blemishes and imperfections in the ware produced therefrom, which renders it unfit for use.

Aside from the foregoing considerations, the molten glass must be of the proper uniform viscosity at the time it is removed from the supply body, otherwise portions of the charge will be more readily workable,—that is, will stretch or blow more easily than other portions—unless the glass is maintained in a homogeneous condition. Thus, portions of articles of glassware made from non-homogeneous glass as regards viscosity, will be blown or drawn to greater thinness than other portions; consequently, the ware will be of uneven thickness and will contain waves and other imperfections.

When articles of glassware of varying sizes and shapes are being produced, the glass from which the said articles are formed should vary in viscosity as the size of the mold charges. Relatively large articles of glassware should be formed from glass of relatively high viscosity, whereas, relatively small articles should be formed from glass of comparatively low viscosity. Therefore, in manufacturing such glassware, it becomes desirable to provide separate bodies of glass subjected to different temperature environments, and also to guard against changes in the character of the glass of each body such as devitrification, and variations in viscosity, as previously mentioned.

It is an object of the present invention to provide a novel method of, and apparatus for, supplying glass by the employment of which one or more bodies of glass of homogeneous character and possessing the desired viscosity may be procured in an economical and efficient manner.

A further object of my invention is to provide a novel method of and apparatus for supplying glass, wherein one or more bodies of glass may be obtained, each body possessing the desired homogeneity and viscosity, such properties being assured by preventing the formation of pockets or chilled or stagnated glass therein and by heating and circulating the glass in a novel and highly practical manner.

Another object of my invention is to provide a melting tank or furnace of novel character, which, while capable of being employed for supplying glass in any known manner to various types of forming machines, is especially adapted to provide one or more supply bodies for the gathering of charges of glass by the suction method. Such a tank or furnace may be characterized by the provision of means whereby homogeneous glass may be obtained, and if more than one body of glass is provided, such bodies may be subjected to the same or to different temperature conditions, to provide molten glass of the same or of varying viscosity. The temperature conditions to which the glass is subjected may serve to continuously refine and condition the glass to insure the maintenance of the homogeneity thereof, and the glass may be circulated in such a manner as to cause chilled portions produced therein by gathering operations, to be reassimilated by, and to become interfused with the main body, or bodies, of the glass.

Other objects and advantages of the invention will be pointed out in detailed description thereof which follows, or will become apparent from such description.

In order that my invention may be more fully comprehended, and its manifold practical advantages appreciated, reference should be had to the accompanying drawing in which I have illustrated an embodiment of a melting tank or furnace by which the method of my invention may be practiced.

In said drawing:

Figure 1 is a view in transverse vertical sectional elevation of the construction shown in Fig. 3, and taken on the line 1—1 of Fig. 3;

Fig. 2 is a view in horizontal sectional top plan of the construction shown in Fig. 3 and taken on the line 2—2 of Fig. 3; and Fig. 3 is a view in vertical longitudinal section of a portion of a melting tank embodying my invention, said view being taken on the line 3—3 of Fig. 1.

For the accomplishment of the above mentioned objects, and other objects, I may employ a melting tank including one or more refining and conditioning chambers to which molten glass may be supplied directly from a suitable melting chamber. Heat may be conducted to the spaces above the glass in the refining chamber, or chambers, directly from the melting chamber, and if desirable or necessary, additional temperature controlling means may be associated with the forward portion of the tank, for maintaining the glass therein at the desired temperature. Each refining chamber may have a gathering opening formed in the forward or front portion thereof, and the bottom of the chamber may be so shaped as to provide a body of glass of a minimum depth consistent with the depth at which the glass may be most efficiently maintained at the desired viscosity and in a homogeneous condition. By providing a plurality of refining chambers, in the manner described, a plurality of bodies of glass may be obtained which may be subjected individually to varying temperature conditions for supplying charges of glass of different sizes. The shape of each refining chamber also may be such as to induce highly advantageous circulation of the glass to cause chilled portions, such as may be produced by the gathering operation, to be assimilated by and interfused with the homogeneous glass.

Referring in detail to the drawing:

The numeral 1 designates generally the melting tank or furnace. The melting tank includes a melting chamber 2, of suitable construction (only a portion of which is shown), but preferably having an upwardly extending portion 2a formed in the roof thereof to permit unrestricted flow of hot gases and radiation of heat to the front of the tank. The melting chamber is separated from a plurality of refining and conditioning chambers 3, 4 and 5, by the bridge wall 6. Molten glass is conducted from the melting chamber to the respective refining chambers through submerged throat 7 which extends beneath the bridge wall, as shown.

Interposed between the top of the bridge wall and the roof of the melting tank, are vertical shadow walls 8 which may consist of open checker work for permitting gases of combustion to pass from the combustion space above the glass in the melting tank, to the spaces above the glass in the respective refining chambers. The glass in the refining chambers is heated primarily by such gases.

The openings in the walls 8 may be of varying sizes to permit correspondingly varying quantities of hot gases to pass into the chambers 3, 4 and 5 respectively, and/or said walls may be provided with adjustable gates for controlling the flow of such gases into said chambers as disclosed in the co-pending application of William T. Barker, Jr. Ser. No. 364,389, filed May 20, 1929.

In the construction illustrated, the refining or conditioning chambers 3, 4 and 5 are of rectangular shape in plan, being separated from each other by pairs of spaced vertical longitudinal walls 9. Each pair of walls is connected at its top by a horizontal wall 10, but is open at the bottom to permit air to circulate freely between the walls of the refining chambers to cool said walls. Partition walls 11 supported on the walls 10, extend upwardly to complete the separation of the refining chambers and serve to support the roof of the tank. The chambers 3, 4 and 5 may be identical in construction and a description of one will suffice for all.

Referring to Fig. 3, it will be observed that the bottom 12, which may be substantially flat, is inclined upwardly in a plane to approximately the point A, at which point said bottom merges with the downwardly and inwardly curved portion 13 of a boot or extension 14. The top or roof 15 of the refining or conditioning chamber may be arched as shown and is inclined downwardly toward the front of the tank, and terminates short of the boot 14, where it joins a vertical wall 16 having an inwardly curved portion 17. The wall 16 extends downwardly to approximately the surface of the glass in said chamber.

As shown in Fig. 3, the pool of glass in a refining chamber gradually diminishes in depth in an outward direction toward the forward portion of the tank, and in like manner the heating space above the glass in said chamber gradually diminishes in height toward the forward portion of the tank. Such construction is highly advantageous. As the glass moves through the refining chamber from near the point at which it enters through the throat, toward the forward portion of the chamber, it tends to become increasingly cooler from the dissipation of heat through the walls of the tank and it is desirable to compensate to a certain extent such heat dissipation. That is accomplished in applicant's construction by the heating space which, because of the fact that it gradually diminishes in height toward the forward portion of the tank, causes hot gases of combustion supplied to the heating space from the melting chamber to be increasingly compacted and concentrated toward the surface of the glass. Hence a rising temperature gradient from say the bridge wall 6 to the outer vertical wall 16 may be established in the heating space above the glass in accordance with the falling temperature gradient in the glass itself, which results in the proper heat balance between the hot gases of combustion and the molten glass to maintain the glass at the desired viscosity and at the desired temperature. Such heating of the glass as is afforded by applicant's construction is of particular utility because of the fact that the pool of glass is relatively shallow, particularly at the forward portion of the tank, toward which portion the glass is maintained in the proper condition with increasing difficulty because of such shallowness. The difficulty arises from the fact that a chilled layer of glass is formed or tends to be formed around the body of a pool of glass where it contacts with the walls of the tank, and such layer hence becomes proportionately thicker as the pool of glass diminishes in depth. It is desirable to reduce to a minimum the thickness of the chilled layer of glass around the pool thereof especially in the shallower part, and that is accomplished to a large extent by applicant's novel construction.

Formed between the front of the extension or boot 14 and the curved portion 17 of wall 16 is a gathering opening 18 through which the molds, one of which is indicated diagrammatically at 19, of a suction machine (not shown) may dip successively to gather charges of glass from the glass in the extension or booth, in known manner. The opening 18 is curved inwardly to conform with the shape of the wall portion 17 and with the circular path of the molds 19.

The molds 19 of the machines which gather charges from the pools in the refining chambers may be of different sizes to form glassware of correspondingly different sizes.

As previously stated, the glass in the refining chamber is heated primarily by gases of combustion conducted thereinto from the melting chamber. However, it sometimes is desirable to selectively control the temperature in the respective chambers and to this end the following means is provided: Formed in the roof 15 is an opening 20 with which a cover or damper 21 hinged to said roof, is adapted to cooperate. By opening the damper or cover 21 to greater or less extent, more or less of the gases of combustion in the refining chamber may be permitted to escape, thereby controlling the temperature in the chamber, and maintaining the glass at the desired viscosity. As the glass flows outwardly through the refining chamber, it is apt to become unduly cool and in order to maintain the glass at the desired temperature in the forward or front portions of the refining chamber, and in or near the extension or boot, burners 22 are provided. These burners are located in openings 23 formed in the wall 16, and are set at angles to the said wall to direct gases of combustion toward the middle of the chamber near the forward portion thereof. By regulating the supply of fuel to the burners 22, and/or properly adjusting the damper or cover 21, the desired temperature condition may be maintained in the refining or glass conditioning chamber.

In the operation of my novel melting tank, and in practicing the method of my invention, molten glass flows from the melting chamber 2 into the respective refining chambers 3, 4 and 5. As will be obvious, the glass in the respective chambers may be subjected to the same temperature conditions, or to different temperature conditions, to provide separate bodies of molten glass of the same or of different viscosity. By reason of the provision of the heating means in each of the chambers, the glass will be refined and will be maintained in a substantially homogeneous condition. It should be remarked that because of the upward and outward inclination of the bottom of the refining chamber, the depth of the glass therein diminishes gradually toward the forward or discharge end thereof, and consequently the amount of glass in said chambers is relatively small. By so constructing the refining chambers, I am enabled to provide bodies of homogeneous glass more economically than has been possible heretofore and which is readily responsive to local heat control near the charge gathering zone.

The upward inclination of the bottom of the refining chamber tends to cause the glass flowing into said chamber to proceed directly toward the gathering opening. The paths of such glass are indicated approximately by the solid arrows in Fig. 3. As charges of glass are gathered through the gathering openings, the tails or strings of chilled glass, which usually are produced by severing the charges in known manner, drop back into the glass and are caused to circulate downwardly and rearwardly away from the gathering areas by the downwardly and inwardly curved portion 13 of the boot or extension 14 and along paths indicated approximately by the dotted arrows in Fig. 3. Such circulation is assisted by the inclined bottom, the incoming glass entraining the chilled portions and reheating the same.

The inclined bottoms of the refining chambers and the inwardly and downwardly curved extensions thereof, serve to provide refining chambers in which the formation of pockets or of dead portions of glass is prevented, and in which the chilled or cool portions of the glass produced by contact of the gathering implements therewith are constantly assimilated and interfused with the homogeneous portions thereof. The removal of the chilled portions of the glass resulting from the gathering operations, and the prevention of stagnation and consequent devitrification are further assisted by the supply of heat to the refining chambers from the melting chamber and from the burners 22.

The arrangement of the refining chambers in conjunction with the melting chamber, and the construction of the extensions of said chambers provides an exceedingly simple and compact melting tank of rectangular shape. Moreover, a construction embodying my invention is especially advantageous because of the relatively short distance which the glass must travel between the melting tank and the gathering point. The omission of extensive forehearths, channels, and the like, presents the advantage of enabling glass to be supplied to the gathering point without being unduly cooled during the travel thereof toward said gathering point from the melting chamber. As previously stated, such undesirable cooling of the glass is further prevented by the provision of the means for continuously heating the glass in the refining chambers and near the gathering openings.

Having thus described my invention, what I desire to claim and secure by Letters Patent is:

1. The method of supplying molten glass which comprises, conducting a stream of glass directly from a lower stratum only of the glass in a melting chamber to a refining chamber of glass in the refining chamber to maintain a pool of gradually outwardly diminishing depth, conducting hot gases of combustion from the melting chamber outwardly through the refining chamber in a stream of vertically diminishing depth to refine the glass in the pool and to render it homogeneous, causing the incoming stream of glass to flow upwardly and outwardly through the pool into a zone in said pool in which mold charges are removed from the surface of the glass withdrawing charges of glass directly from the surface of the glass in said zone, applying additional heat to the pool of glass in the region of the zone of withdrawal to maintain the glass in such region at the desired temperature, controlling the heating of the glass in said pool to obtain glass of the desired viscosity for forming glassware, and causing the chilled portions of glass which may be produced by the removal of the charges from the pool, to be circulated downwardly in the pool away from the point of removal and to be entrained and reassimilated by the incoming stream of glass.

2. A glass melting tank comprising a melting chamber, a refining and conditioning chamber, a bridge wall separating said chambers, a submerged throat formed under said bridge wall, means for supplying heat from the melting chamber to the refining chamber, means for controlling the temperature in said refining chamber to maintain the glass therein at the desired viscosity, said refining chamber having an upwardly inclined bottom, and an extension formed on the forward portion of said refining chamber, said extension being inclined downwardly and inwardly to where it is connected with the inclined bottom of said chamber, said extension providing an opening for supplying charges of glass directly from the pool in said refining chamber, and cooperating with the inclined bottom of said chamber to cause the glass to be circulated downwardly and rearwardly whereby chilled portions of glass are entrained by the incoming stream of glass and are assimilated thereby.

3. A glass melting tank comprising a melting chamber and a nose portion connected thereto, said nose portion comprising side and front walls, a single bridge wall extending transversely of said tank for separating the melting chamber from the interior of the nose portion, partitioning means extending lengthwise of the tank from the bridge wall to and terminating at the front of the nose portion, and internally dividing the nose portion into a plurality of separated glass conditioning chambers for containing separate pools of glass, partitions extending from the bridge wall to and terminating at the front of the nose portion for internally dividing the upper portion of the nose into a plurality of longitudinally united heating chambers overlying and individual to the conditioning chambers, means for independently controlling the temperature conditions in said heating chambers, submerged throats ex-

CERTIFICATE OF CORRECTION.

Patent No. 1,913,311.  June 6, 1933.

VERGIL MULHOLLAND.

It is hereby certified that error appears in the printed specification of the above numbered patent requiring correction as follows: Page 4, line 61, claim 1, strike out the words "of glass in the refining chamber" and insert the same after "pool" in line 62; and that the said Letters Patent should be read with this correction therein that the same may conform to the record of the case in the Patent Office.

Signed and sealed this 8th day of August, A. D. 1933.

(Seal)

M. J. Moore.
Acting Commissioner of Patents.